United States Patent [19]
Greuel

[11] Patent Number: 5,922,425
[45] Date of Patent: *Jul. 13, 1999

[54] MULTI-LAYER COMPOSITIONS AND ARTICLES COMPRISING FLUORINE-CONTAINING POLYMER

[75] Inventor: Michael P. Greuel, White Bear Township, Minn.

[73] Assignee: Minnesota Mining and Manufacturing Company, St. Paul, Minn.

[*] Notice: This patent is subject to a terminal disclaimer.

[21] Appl. No.: 08/672,392

[22] Filed: May 28, 1996

[51] Int. Cl.$^6$ .............................. B32B 1/08; B32B 27/08; B32B 27/32; B32B 31/30
[52] U.S. Cl. .................... 428/36.91; 428/36.6; 428/36.9; 428/421; 428/422; 526/250; 526/253; 526/254; 526/255; 264/171.1; 264/173.16; 427/407.1
[58] Field of Search .................... 428/35.7, 36.6, 428/36.7, 36.9, 36.8, 36.91, 421, 422; 526/242, 250, 254, 253, 255; 156/307.1, 307.3, 308.2, 244.13; 264/510, 512, 514, 515, 171.1, 173.16; 427/407.1

[56] References Cited

U.S. PATENT DOCUMENTS

| | | | |
|---|---|---|---|
| 4,588,642 | 5/1986 | Ochiumi | 428/421 |
| 5,285,002 | 2/1994 | Grootaert | 526/222 |
| 5,441,782 | 8/1995 | Kawashima et al. | 428/36.9 |
| 5,463,006 | 10/1995 | Abusleme et al. | 526/247 |
| 5,500,257 | 3/1996 | Krause et al. | 427/487 |
| 5,570,711 | 11/1996 | Walsh | 138/137 |
| 5,623,038 | 4/1997 | Greuel et al. | 526/255 |
| 5,656,121 | 8/1997 | Fukushi | 156/326 |

FOREIGN PATENT DOCUMENTS

| | | |
|---|---|---|
| 0 479 592 | 4/1992 | European Pat. Off. . |
| 51-019082 | 2/1976 | Japan . |
| 53-043552 | 11/1978 | Japan . |
| 57-083432 | 5/1982 | Japan . |
| 61-171981 | 8/1986 | Japan . |

| | | |
|---|---|---|
| WO 96/05965 | 2/1996 | WIPO . |

OTHER PUBLICATIONS

Grootaert et al., "Fluorocarbon Elastomers," Kirk–Other, Encyclopedia of Chemical Technology, vol. 8, pp. 990–1005 (4th Ed., John Wiley & Sons, 1993).

Encyclopedia of Polymer Science and Engineering, vol. 6, pp. 571–576 and 608–613, John Wiley & Sons, New York, (1986).

Encyclopedia of Polymer Science and Engineering, vol. 17, pp. 828–842, John Wiley & Sons, New York, (1989).

Claude Levallee, "THV Fluoropolastic Expanding Fluoropolymer Processing Options," (1995).

F.W. Billmeyer, Textbook of Polymer Science 3rd Ed., pp. 398–403, John Wiley & Sons, New York (1984).

R.A. Brullo, "Fluoroelastomer Rubber for Automotive Applications," Automotive Elastomer & Design (1985).

R.A. Brullo, "Fluoroelastomer Seal Up Automotive Future," Materials Engineering (1988).

"Organic Fluorine Compounds," Kirk–Othmer, Encyclopedia of Chemical Technology, vol. 11, pp. 20, 21, 32, 33, 40, 41, 48, 50, 52, 62, 70, 71, John Wiley & Sons (1980).

*Primary Examiner*—Vivian Chen
*Attorney, Agent, or Firm*—Lucy C. Weiss

[57] ABSTRACT

A multi-layer composition comprises (a) a first layer comprising semi-crystalline copolymer comprising interpolymerized units derived from tetrafluoroethylene and allylic hydrogen-containing olefin monomer (e.g., propylene), wherein less than 10% of the total heat of fusion is attributable to a secondary melt-transition above 300° C. as shown by the heating curve from Differential Scanning Calorimetry; and (b) a second layer comprising melt-processable polymer (e.g., polyethylene) which is both substantially thermally stable and capable of being melt-processed at temperatures below the decomposition temperature of the semi-crystalline copolymer. The multi-layer composition can be used to form shaped articles (e.g., films, sheets, tubing, coated wires, cable jacketing, or bottles) for use in a variety of applications.

18 Claims, 1 Drawing Sheet

MULTI-LAYER COMPOSITIONS AND ARTICLES COMPRISING FLUORINE-CONTAINING POLYMER

FIELD OF THE INVENTION

This invention relates to multi-layer compositions comprising fluorine-containing polymer. In another aspect, this invention relates to shaped articles comprising the multi-layer compositions. In yet another aspect, this invention relates to a process for preparing the multi-layer compositions.

BACKGROUND OF THE INVENTION

Fluorine-containing polymers, or fluoropolymers, are an important class of polymers and include for example, amorphous fluorocarbon elastomers and semi-crystalline fluorocarbon plastics. Within this class are polymers of high thermal stability and usefulness at high temperatures, and extreme toughness and flexibility at very low temperatures. Many of these polymers are almost totally insoluble in a wide variety of organic solvents, and are chemically inert. Some have extremely low dielectric loss and high dielectric-strength, and most have unique nonadhesive and low-friction properties. See, for example, F. W. Billmeyer, *Textbook of Polymer Science*, 3rd ed., pp. 398–403, John Wiley & Sons, New York (1984).

Amorphous fluorocarbon elastomers, particularly the copolymers of vinylidene fluoride with other ethylenically unsaturated halogenated monomers, such as hexafluoropropene, have particular utility in high temperature applications, such as seals, gaskets, and linings—see, for example, Brullo, R. A., "Fluoroelastomer Rubber for Automotive Applications," *Automotive Elastomer & Design*, June 1985, "Fluoroelastomer Seal Up Automotive Future," *Materials Engineering*, October 1988, and W. M. Grootaert, G. H. Millet, and A. T. Worm, "Fluorocarbon Elastomers," Kirk-Othmer, *Encyclopedia of Chemical Technology*, Vol. 8, pp. 990–1005 (4th ed., John Wiley & Sons, 1993).

Semi-crystalline fluoroplastics, particularly polychlorotrifluoroethylene, polytetrafluoroethylene, copolymers of tetrafluoroethylene and hexafluoropropylene, and poly(vinylidene fluoride), have numerous electrical, mechanical, and chemical applications. Fluoroplastics are useful, for example, in wire coatings, electrical components, seals, solid and lined pipes, and pyroelectric detectors. See, for example, "Organic Fluorine Compounds," Kirk-Othmer, *Encyclopedia of Chemical Technology*, Vol. 11, pp. 20, 21, 32, 33, 40, 41, 48, 50, 52, 62, 70, 71, John Wiley & Sons, (1980).

In spite of their many good properties, a drawback of most semi-crystalline fluoroplastics is their need for high processing temperatures. Since the decomposition temperatures of the fluoroplastics tend to be in the same range as the processing temperatures for many of these materials, corrosion-resistant equipment is required. Furthermore, the need for high processing temperatures prevents the co-processing of the fluoroplastics with other polymeric materials which are not thermally stable at such temperatures. When a multi-layer composition is desired, the materials must be processed sequentially or the fluoroplastics must be paired with high temperature resistant polymers which tend to be more expensive. Thus, there is a need in the art for semi-crystalline fluoroplastics which can be processed at lower temperatures and for one-step methods for preparing multi-layer compositions therefrom. There is also a need for multi-layer compositions which exhibit chemical resistance, barrier properties, low flammability, and good electrical properties for use in applications such as wire and cable insulation, hose constructions, electrical connections, and heat-shrink tubing.

SUMMARY OF THE INVENTION

Briefly, in one aspect, this invention provides a multi-layer composition comprising (a) a first layer comprising semi-crystalline copolymer comprising interpolymerized units derived from tetrafluoroethylene (TFE) and allylic hydrogen-containing olefin monomer (e.g., propylene), wherein less than 10% (preferably less than 5%) of the total heat of fusion is attributable to a secondary melt-transition above 300° C. as shown by the heating curve from Differential Scanning Calorimetry (DSC); and (b) a second layer comprising melt-processable polymer (e.g., polyethylene) which is both substantially thermally stable and capable of being melt-processed at temperatures below the decomposition temperature of the semi-crystalline copolymer.

It has been discovered that certain polymerization techniques provide semi-crystalline copolymers of TFE and allylic hydrogen-containing monomer which, unlike prior art copolymers of TFE and allylic hydrogen-containing monomer, can be more easily processed at low temperatures, e.g., temperatures as low as about 200° C. or lower (depending upon the particular types and amounts of monomers utilized). This enables the one-step preparation of multi-layer compositions by co-processing (e.g., co-extrusion, co-blow molding, or co-injection molding) of the copolymers with one or more dissimilar resins (e.g., polyolefins or other fluoropolymers). Since the copolymers (unlike those prior art semi-crystalline fluoroplastics which are also low temperature processable) surprisingly exhibit a low dielectric constant and low dissipation factor, multi-layer compositions which also exhibit these properties (as well as chemical and weather resistance, low permeability to gases and/or liquids, and low flammability) can be prepared therefrom. Such multi-layer compositions can be used to form shaped articles (e.g., films, sheets, tubing, wire coatings, cable jacketing, or bottles) for use in a variety of applications (including, e.g., electrical, electronic, and chemical transfer applications).

In other aspects, this invention also provides shaped articles comprising the multi-layer composition of the invention and a one-step process for preparing the composition.

DETAILED DESCRIPTION OF THE INVENTION

Figure 1:
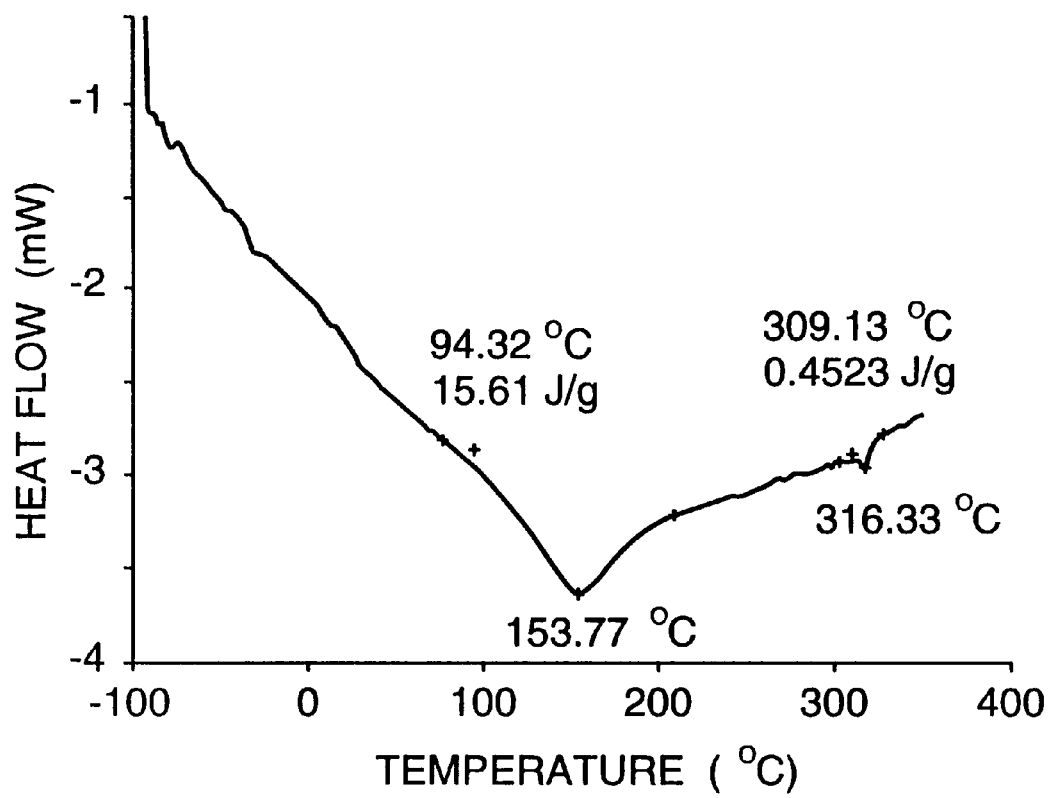
FIG. 1 shows a heating curve from Differential Scanning Calorimetry (DSC) for the semi-crystalline copolymer prepared in Example 1, infra.

Copolymers of TFE and allylic hydrogen-containing monomer suitable for use in preparing the multi-layer composition of the invention can be prepared using the initiating system described in U.S. Pat. No. 5,285,002 (Grootaert), the description of which is incorporated herein by reference. With this initiating system, both redox and thermal initiation is possible for monomer mixtures containing fluorine-containing monomers and allylic-hydrogen containing monomers. The process does not require cosolvents such as tertiary butanol, can be run smoothly at relatively low pressures, and proceeds at relatively rapid reaction rates. The copolymers obtained are of usable molecular weight (as indicated by their viscosity or melt-flow index (MFI) which are in the range of viscosities or MFI generally seen in commercially useful polymers). Furthermore, there is no evidence of degradative chain transfer, even when the polymerization is carried out at elevated temperatures such as 71° C., as evidenced by the absence of a detectable $CF_2H$ resonance in the proton NMR.

A class of fluoroaliphatic sulfinates useful in initiating the polymerization can be represented by the following general formulae $$R_f SO_2 M_{1/x} \quad \quad \text{I}$$

or $$R_f'[SO_2 M_{1/x}]_n \quad \quad \text{II}$$

wherein $R_f$ represents a monovalent fluoroaliphatic group having, for example, from 1 to 20 carbon atoms, preferably 4 to 10 carbon atoms; $R_f'$ represents a polyvalent, preferably divalent, fluoroaliphatic group having, for example, from 1 to 20 carbon atoms, preferably from 2 to 10 carbon atoms; M represents a hydrogen atom or cation with valence x, which is 1 to 2, and is preferably 1, n is 2 to 4, preferably 2.

The monovalent fluoroaliphatic group, $R_f$, is a fluorinated, stable, inert, non-polar, saturated moiety. It can be straight chain, branched chain, and, if sufficiently large, cyclic, or combinations thereof, such as alkyl cycloaliphatic groups. Generally, $R_f$ will have 1 to 20 carbon atoms, preferably 4 to 10, and will contain 40 to 83 weight percent, preferably 50 to 78 weight percent fluorine. The preferred compounds are those in which the $R_f$ group is fully or substantially completely fluorinated, as in the case where $R_f$ is perfluoroalkyl, $C_nF_{2n+1}$, where n is 1 to 20.

The polyvalent, preferably divalent, fluoroaliphatic group, $R_f'$, is a fluorinated, stable, inert, non-polar, saturated moiety. It can be straight chain, branched chain, and, if sufficiently large, cyclic or combinations thereof, such as alkyl cycloaliphatic divalent groups. Generally, $R_f'$, will have 1 to 20 carbon atoms, preferably 2 to 10. Examples of preferred compounds are those in which the $R_f'$ group is perfluoroalkylene, $C_nF_{2n}$, where n is 1 to 20, or perfluorocycloalkyl, $C_nF_{2n-2}$, where n is 5 to 20.

With respect to either $R_f$ or $R_f'$, the skeletal chain of carbon atoms can be interrupted by divalent oxygen, hexavalent sulfur or trivalent nitrogen hetero atoms, each of which is bonded only to carbon atoms, but preferably where such hetero atoms are present, such skeletal chain does not contain more than one said hetero atom for every two carbon atoms. An occasional carbon-bonded hydrogen atom, iodine, bromine, or chlorine atom may be present; where present, however, they preferably are present not more than one for every two carbon atoms in the chain. Where $R_f$ or $R_f'$ is or contains a cyclic structure, such structure preferably has 6 ring member atoms, 1 or 2 of which can be said hetero atoms, e.g., oxygen and/or nitrogen. Examples of $R_f$ groups are fluorinated alkyl, e.g., $C_4F_9$—, $C_6F_{13}$—, $C_8F_{17}$—, alkoxyalkyl, e.g., $C_3F_7OCF_2$—. Examples of $R_f'$ are fluorinated alkylene, e.g., —$C_4F_8$—, —$C_8F_{16}$—. Where $R_f$ is designated as a specific group, e.g., $C_8F_{17}$—, it should be understood that this group can represent an average structure of a mixture, e.g., $C_6F_{13}$— to $C_{10}F_{21}$—, which mixture can also include branched structures.

Representative fluoroaliphatic sulfinate compounds useful in preparing the copolymers include the following:

$CF_3SO_2Na$
$C_4F_9SO_2H$
$C_4F_9SO_2Na$
$C_6F_{13}SO_2Na$
$C_8F_{17}SO_2Na$
$CF_3C(Cl)_2CF_2SO_2K$
$Cl(CF_2)_8OC_2F_4SO_2Na$
$Cl(CF_2)_xCF_2SO_2Na$ where x is 1 to 10
$NaO_2SC_8F_{16}SO_2Na$
$NaO_2SC_6F_{12}SO_2Na$
$NaO_2SC_2F_4OC_2F_4SO_2Na$
$NaO_2SC_2F_4OC_2F_4X$, where X is Br or I
$NaO_2S(C_4F_8O)_nC_3F_6SO_2Na$ where n is 1 to 20
$NaO_2SCF_2O(CF_2CF_2O)_m(CF_2O)_nCF_2SO_2Na$ where n and m are each 1 to 20
$(CF_3)_2NCF_2CF_2SO_2Na$
$(C_2F_5)_2NCF_2CF_2SO_2Na$
$N(C_2F_4SO_2Na)_3$
$NaO_2SC_8F_{16}SO_2F$
$NaO_2SC_3F_6O(C_4F_8O)_nC_3F_6SO_2Na$ where n is 4 to 8

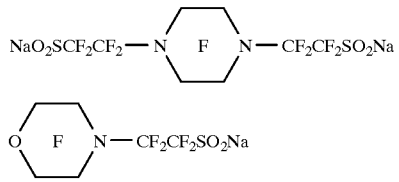

A class of allylic hydrogen-containing olefin monomers useful in preparing the copolymers are those mono-olefins which contain only carbon, hydrogen, and halogen atoms. Representative examples of suitable allylic hydrogen-containing olefin monomers include propylene, butylene, isobutylene, and 1,1,2-trifluoropropene. Preferably, the allylic hydrogen-containing olefin monomer is propylene.

The monomer mixtures useful in preparing the copolymers can also contain additional ethylenically unsaturated comonomers, e.g., ethylene, butadiene, hexafluoropropylene, or vinylidene fluoride. Said monomer mixtures may also contain iodine- or bromine-containing cure-site comonomers (in amounts such that the electrical and other properties of the copolymers are not impaired thereby) in order to prepare peroxide curable polymers. Suitable cure-site monomers include terminally unsaturated mono-olefins of 2 to 4 carbon atoms such as bromodifluoroethylene, bromotrifluoroethylene, iodotrifluoroethylene, $CF_2$=$CFOCF_2CF_2Br$, and 4-bromo-3,3,4,4-tetrafluorobutene-1.

Conventional emulsion or suspension free-radical polymerization techniques can be used to prepare the copolymers. (Such conventional emulsion or suspension polymerization techniques typically involve polymerizing monomers in an aqueous medium in the presence of an inorganic free-radical initiator system and surfactant or suspending agent.) The fluorinated sulfinate serves as a reducing agent and a water soluble oxidizing agent capable of converting the sulfinate to a sulfonyl radical. Preferred oxidizing agents are sodium, potassium, and ammonium persulfates, perphosphates, perborates, and percarbonates. Particularly preferred oxidizing agents are sodium, potassium, and ammonium persulfates. The sulfonyl radical so produced is believed to eliminate $SO_2$, forming a fluorinated radical that initiates the polymerization of the monomers.

In addition to the sulfinate, other reducing agents can be present, such as sodium, potassium or ammonium sulfites, bisulfite, metabisulfite, hyposulfite, thiosulfite, phosphite, sodium or potassium formaldehyde sulfoxylate or hypophosphite. Activators such as ferrous, cuprous, and silver salts, can also be present.

Aqueous emulsion and suspension polymerizations can be carried out under conventional steady-state conditions in which, for example, monomers, water, surfactants, buffers and catalysts are fed continuously to a stirred reactor under optimum pressure and temperature conditions while the resulting emulsion or suspension is removed continuously. An alternative technique is batch or semibatch polymerization by feeding the ingredients into a stirred reactor and allowing them to react at a set temperature for a specified length of time or by charging ingredients into the reactor and feeding the monomer into the reactor to maintain a constant pressure until a desired amount of polymer is formed.

The amount of fluoroaliphatic sulfinate used can vary, depending, for example, on the molecular weight of polymer desired. Preferably the amount of fluoroaliphatic sulfinate is from 0.01 to 50 mole %, and most preferably from 0.05 to 10 mole %, of sulfinate compound based on total quantity of monomers.

Combinations of monosulfinates, disulfinates, and trisulfinates can be used, depending on whether it is desired to use sulfinate as an initiator, a monomer, or both. When polyvalent sulfinates, such as those represented by Formula II, are used, the sulfinate is believed to act as a monomer and the fluorinated moiety is believed to be incorporated into the polymer backbone. When monosulfinates are used, the fluorinated moiety is believed to be incorporated as a polymer end group.

The semi-crystalline copolymers useful in preparing the multi-layer composition of this invention comprise interpolymerized units derived from TFE and allylic hydrogen-containing olefin monomer. The copolymers can generally contain, e.g., from about 2 weight percent to about 20 weight percent (preferably from about 5 weight percent to about 15 weight percent, more preferably from about 7 weight percent to about 12 weight percent) allylic hydrogen-containing olefin monomer. The copolymers differ from those of the prior art in that they exhibit a much smaller high-temperature melt-peak. This is demonstrated by DSC curves which show that in the copolymers less than 10%, preferably less than 5%, most preferably less than 3%, of the total heat of fusion is attributable to a secondary melt-transition above 300° C. The semi-crystalline copolymers possess improved processing compared to prior art polymers, particularly at low processing temperatures, i.e., at or below 300° C. Typically, processing temperatures can be in the range of about 250° C. or as low as about 200° C. or lower, depending upon the particular types and amounts of monomers utilized.

The sulfinate compounds provide copolymers which have non-polar, non-ionic end groups. These non-ionic end groups generally result in improved properties such as improved thermal stability, improved dielectric properties, and improved rheological behavior. Polymers with non-ionic end groups exhibit lower apparent viscosities during processing, e.g. injection molding, when compared at the same shear rates to polymers with ionic end groups.

Fillers can be mixed with the copolymer(s) to improve molding characteristics and other properties to the extent that the fillers do not significantly impair the desired properties of the copolymers. When a filler is employed, it can be added in amounts of up to about 100 parts per hundred parts by weight of polymer, preferably between about 15 to 50 parts per hundred parts by weight of the polymer. Examples of fillers which can be used are thermal-grade carbon blacks, or fillers of relatively low reinforcement characteristics such as clays and barytes. Other additives, e.g., pigments, processing aids (e.g., polyolefins), stabilizers, and adhesion promoters can also be mixed with the copolymer(s).

Melt-processable polymers which can be paired with one (or more, e.g., in the form of a blend) of the above-described semi-crystalline copolymers to form the multi-layer compositions of the invention are those amorphous or semi-crystalline polymers which are substantially thermally stable and melt-processable at temperatures below the decomposition temperature of the semi-crystalline copolymer(s) utilized. The polymers can be thermoplastic, thermoset, or elastomeric. Useful polymers include olefin homopolymers and copolymers (with other olefin and/or non-olefin monomers), polyesters, polyamides, polyacrylates, polymethacrylates, poly(vinyl chloride), styrene homopolymers and copolymers, homopolymers and copolymers of vinylidene fluoride, polycarbonates, polyurethanes, natural and synthetic rubbers and elastomers, fluorinated elastomers, and blends thereof, as well as the semi-crystalline copolymers described above (and blends thereof). Representative examples of useful olefins include ethylene, propylene, 1-butene, 1-hexene, 4-methyl-1-pentene, and 1-octene. Representative examples of useful non-olefin monomers which are copolymerizable with the olefins include vinyl ester monomers such as vinyl acetate, vinyl propionate, vinyl butyrate, vinyl chloroacetate, and vinyl chloropropionate; acrylic and methacrylic acid monomers and their alkyl esters such as acrylic acid, methacrylic acid, ethacrylic acid, methyl acrylate, and ethyl acrylate; amides such as acrylamide and methacrylamide; nitriles such as acrylonitrile; vinyl aryl monomers such as styrene, o-methoxystyrene, p-methoxystyrene, and vinyl naphthalene; vinyl and vinylidene halide monomers such as vinyl chloride, vinylidene chloride, and vinylidene bromide; alkyl ester monomers of maleic and fumaric acid and anhydrides thereof such as dimethyl maleate, diethyl maleate, and maleic anhydride; vinyl alkyl ether monomers such as vinyl methyl ether, vinyl ethyl ether, vinyl isobutyl ether, and 2-chloroethyl vinyl ether; vinyl pyridine monomers; N-vinyl carbazole monomers; N-vinyl pyrolidine monomers; and fluorine-containing monomers such as tetrafluoroethylene and hexafluoropropylene.

Of particular usefulness are those polymers of technical importance in the production of wire and cable coverings, e.g., thermoplastics such as polyethylene, poly(vinyl chloride), ethylene-vinyl acetate copolymers, ethylene-alkyl acrylate copolymers, polypropylene, and polyamide; thermoplastic elastomers such as triple-block copolymers, polyurethanes, polyesters, and blends of polyolefins and rubber; and elastomers such as natural rubber, butyl rubber, styrene-butadiene rubber, nitrile-butadiene rubber, ethylene-propylene rubber, ethylene-propylene terpolymer rubber, polychloroprene, chlorosulfonated polyethylene, silicone rubber, epichlorohydrin rubber, and ethylene-vinyl acetate copolymers. Blends of these can also be utilized. Preferred polymers for use in the polymer compositions include olefin homopolymers and copolymers, poly(vinyl chloride), polyamides, homopolymers and copolymers of vinylidene fluoride, and blends thereof, most preferably, olefin homopolymers and copolymers, poly(vinyl chloride), and blends thereof. The polymer compositions can further contain one or more additives, e.g., plasticizers, stabilizers, fillers, processing aids, pigments, and adhesion promoters.

In preparing the multi-layer compositions of the invention, one or more semi-crystalline copolymers and one or more melt-processable companion polymers can be selected based upon the properties desired for a particular application. (As is known in the art, the molecular weights, molecular weight distributions, copolymer percentages, crystallinities, melting ranges, etc., of the materials can be varied, and additives can optionally be employed to provide or enhance certain characteristics.) The melt-processable companion polymer(s) can have either more or less thermal stability than the semi-crystalline copolymer(s), as long as a set of processing conditions or hardware can be found to co-process all of the materials without significant detriment to the final desired properties of the multi-layer composition. The companion polymer(s) can be chosen to impart certain characteristics, e.g., flame retardancy, flexibility, adhesion, integrity, good mechanical or electrical properties, or clarity, to the multi-layer composition. The companion polymer(s) can also be chosen for economic reasons. The rheological properties of the copolymer(s) and companion polymer(s) can be selected and/or controlled via the processing conditions to achieve a degree of uniformity of the layer thickness and control of adhesion between layers.

The copolymer(s) and companion polymer(s) can be co-processed by any of the methods known in the art for processing the materials selected. For example, the materials can be co-extruded, co-blow molded, or co-injection molded. Co-extrusion is a well-known technique (see, e.g., the descriptions of extrusion and co-extrusion in the *Encyclopedia of Polymer Science and Engineering,* Volume 6, pages 571–576 and 608–613, John Wiley & Sons, New York (1986), the descriptions of which are incorporated herein by reference). Single or twin screw extruders, ram extruders, and gear pumps can be utilized. The co-extrusion shaping die can be, e.g., side- or bottom-fed, spiral, or of a crosshead design and can have multiple manifolds for the distribution and formation of the materials into layers. The inner workings of the die can be configured to allow for minimal or maximum interfacial contact of the materials prior to exiting the die. The revolutions per minute (rpm) of the extruder or polymer metering system can be chosen such that adequate mixing and/or melting of the materials can be achieved without over-shearing or degradation. The rpm and size of the extruder can be chosen so that output rates of each material will be sufficient to form the desired thickness of each layer at the intended line speed.

The copolymer(s) can be fed to an extruder in powder or pellet form, and the companion polymer(s) can be fed in any of the forms commonly used in the art for extrusion (depending upon the particular type of material selected). The ratios of the materials can vary widely depending upon the particular application and the properties desired for the multi-layer composition. The conditions (e.g., pressure and temperature) for the co-processing of the materials can be chosen such that the materials are capable of flowing and being shaped without exceeding the force or safety limitations of the selected processing equipment. Typically, the processing temperatures are chosen so as to be above the melting point(s) of the selected semi-crystalline material(s) and below the temperature or conditions at which selected thermosetting or elastomeric materials may cure or crosslink. It is generally desirable that the maximum temperature at any point in the manufacturing process be below the decomposition temperature(s) for the material(s) in use. Problems due to differences in processing temperatures (or other requirements) between selected materials can be minimized by keeping the melt streams separate for as long as possible, e.g., the materials can be kept separate until they are near or at the die exit. Alternatively, sequential in-line processing (e.g., extrusion coating or powder coating one material over a previously processed material) is also possible, if desired. Subsequent processing (e.g., orientation, injection molding, or sizing) will be dictated by the nature of the final article desired.

The multi-layer compositions (or individual layers thereof) can, if desired, be foamed, cured, or crosslinked, e.g., by exposure to electron beam radiation, by chemical methods, and/or by the addition of heat. If desired, the multi-layer compositions can further comprise one or more additional layers, e.g., an adhesion-promoting tie layer comprising either a blend of the copolymer(s) and companion polymer(s) or a block or graft polymer.

The multi-layer compositions of the invention can be used to fabricate shaped articles, e.g., tubes, bottles, films, sheets, and coated wires, having one or more inner, outer, and/or intermediate layers comprising semi-crystalline copolymer. The compositions are particularly useful as wire insulation for electrical applications due to the chemical and weather resistance, low flammability, low dielectric constant, and low dissipation factor, etc., imparted to the compositions by the semi-crystalline copolymer(s).

Objects and advantages of this invention are further illustrated by the following example, but the particular materials and amounts thereof recited in this example, as well as other conditions and details, should not be construed to unduly limit this invention.

EXAMPLE

In the following example copolymer was prepared. The average reaction rate was observed and calculated in grams of total monomer consumed per liter of water (or water and cosolvent mixture) charged to the reactor per hour ("g/l-h").

MFI for the copolymer was obtained under the conditions described below using the methodology described in ASTM D-1238 using a Tinius Olsen extrusion plastometer.

Thermal analysis was performed using a TA Instruments DSC-2910 and 2000-series controller equipped with an LNCA-II controlled cooling accessory. Heating curves were obtained under nitrogen purge by equilibrating samples at −100° C., holding isothermal for 1 minute, heating to 350° C. at a heating rate of 10° C. per minute, slowly cooling back to −100° C. under the "equilibrating segment" of the equipment software, and heating again to 350° C. at a heating rate of 10° C. per minute.

Unless otherwise indicated, all % are by weight.
Preparation of Sulfinates Fluorochemical sulfinates can be prepared by deiodosulfination of the corresponding iodides following the general procedure of Hu et al. in *J. Org. Chem.* Vol. 56, No. 8, 1991, page 2803. The fluorochemical sulfinates $C_4F_9SO_2Na$ and $C_6F_{13}SO_2Na$ were prepared by reduction of the corresponding sulfonyl fluorides $C_4F_9SO_2F$ and $C_6F_{13}SO_2F$ with $Na_2SO_3$ in a one to one mixture of water and dioxane. See also, U.S. Pat. No. 5,285,002, supra. The purity of these fluorochemical sulfinates, as determined by $^{19}F$ NMR analysis, was about 90%.

Example 1

A 150-liter vertically-stirred polymerization reactor was charged with 120,000 g deionized water, 78 g KOH, 430 g $K_2HPO_4$, 694 g ammonium perfluoro octanoate, and 1.023 g of a 20% solution of $C_4F_9SO_2Na$ in deionized water. The reactor was then alternately evacuated and purged with $N_2$ until $O_2$ level is less than 50 ppm. The reactor was then evacuated, the temperature raised to 71° C., and the agitation set at 210 rpm. Next, the reactor was charged with 3929 g of TFE and 79 g of propylene to give a pressure of 15.2 bar (220 psig). The polymerization was initiated by feeding a 5% solution of $(NH_4)_2S_2O_8$ in deionized water to the reactor by means of a metering pump at approximately 25 g/min until 1 equivalent of $(NH_4)_2S_2O_8$ was fed (approximately 3,200 g of solution). Upon the observation of a pressure drop, the running feed, which consisted of 91% TFE and 9% propylene, was started and continuously adjusted by the reactor's control system in order to maintain the desired pressure. The polymerization was halted by slowing the agitation after 31,300 g of TFE and 3,080 g of propylene had been fed, 5 hours after start of running feed to give a calculated average reaction rate of 57 g/l-h. The reactor was then vented, cooled, and drained to isolate the latex. The resulting copolymer was coagulated by adding HCl to the latex, granulated, washed six times with deionized water, and dried overnight in an oven at 120° C. The copolymer, when analyzed by DSC, exhibited a broad melting transition with a peak melting temperature of 154° C. and a small secondary melt-transition with a peak melting-temperature of 316° C. which integration of the large and small melt-peaks shows accounts for 2.8% of the total heat of fusion (see FIG. 1). Elemental analysis of the copolymer for carbon, hydrogen, and fluorine, indicated a copolymer composition of 90.9% TFE and 9.1% propylene. The Melt Flow Index (MFI) of the copolymer was determined to be 3.3 g/10 min. 265° C. and 2.16 kg applied load.

The copolymer, in either powder or pellet form, is charged to the hopper of a single screw extruder. Drying of the copolymer is optionally carried out. The extruder is of general design for thermoplastics, with a length to diameter ratio of 24/1 and a 3/1 compression ratio, square-pitch screw. Zone temperatures are all set at 230° C. A gear pump is optionally used to control the feed rate and feed pressure of the molten copolymer from the extruder to the die.

A companion polymer, polypropylene (Safe-FR™ 4299, available from UVtec, Inc., Arlington, Tex. a polypropylene formulated for low smoke formation), is fed to the hopper of a second extruder.

Both extruders are operated at similar speeds of 50 rpm, and the output of each extruder is connected directly to a wire-coating die body by means of a heated neck-tube. The die is of a simple cross-head design, and the copolymer is fed through to the inner manifold of the die so as to form an innermost insulating coating (or is fed through to the outer manifold so as to form an outer coating for flame resistance or chemical resistance) over a conductor (a single or multiple strand wire). The companion polymer is fed to the other manifold.

The conductor is fed through the rear of the die to begin the coating process. If desired, the conductor is pre-heated, pre-coated with primer material (for adhesion, stabilization or other purpose), and/or pre-coated with another polymer.

On exiting the coating die, a multi-layer coated wire is produced which is air- or water-quenched. The multi-layer coated wire is optionally bound or bundled with more wires and further jacketed. The multi-layer coated wire is subjected to electron beam discharge in either the molten or solidified state, if desired. (Conditions and procedures can be chosen such that one or more layers of the construction are crosslinked to provide for adhesion and integrity of the various layers.) The finished product is then collected.

Various modifications and alterations of this invention will become apparent to those skilled in the art without departing from the scope and spirit of this invention.

What is claimed is:

1. A multi-layer composition comprising (a) a first layer comprising semi-crystalline copolymer comprising interpolymerized units derived from tetrafluoroethylene and allylic hydrogen-containing olefin monomer, wherein less than 10% of the total heat of fusion is attributable to a secondary melt-transition above 300° C. as shown by the heating curve from Differential Scanning Calorimetry; and (b) a second layer comprising melt-processable polymer which is both substantially thermally stable and capable of being melt-processed at temperatures below the decomposition temperature of said semi-crystalline copolymer.

2. The composition of claim 1 wherein less than 5% of the total heat of fusion is attributable to a secondary melt-transition above 300° C. as shown by the heating curve from Differential Scanning Calorimetry.

3. The composition of claim 1 wherein said allylic hydrogen-containing olefin monomer is a mono-olefin consisting of carbon, hydrogen, and halogen atoms.

4. The composition of claim 3 wherein said allylic hydrogen-containing olefin monomer is selected from the group consisting of propylene, butylene, isobutylene, and 1,1,2-trifluoropropene.

5. The composition of claim 4 wherein said allylic hydrogen-containing olefin monomer is propylene.

6. The composition of claim 1 wherein said copolymer consists essentially of interpolymerized units derived from tetrafluoroethylene and allylic hydrogen-containing olefin monomer.

7. The composition of claim 1 wherein said copolymer consists essentially of interpolymerized units derived from ethylenically-unsaturated monomers.

8. The composition of claim 1 wherein said copolymer further comprises interpolymerized units derived from at least one monomer selected from the group consisting of ethylene, hexafluoropropylene, and vinylidene fluoride.

9. The composition of claim 1 wherein said melt-processable polymer is selected from the group consisting of olefin homopolymers and copolymers, polyesters, polyamides, polyacrylates, polymethacrylates, poly(vinyl chloride), styrene homopolymers and copolymers, homopolymers and copolymers of vinylidene fluoride, polycarbonates, polyurethanes, natural and synthetic rubbers and elastomers, fluorinated elastomers, and blends thereof.

10. The composition of claim 9 wherein said melt-processable polymer is selected from the group consisting of olefin homopolymers and copolymers, poly(vinyl chloride), polyamides, homopolymers and copolymers of vinylidene fluoride, and blends thereof.

11. The composition of claim 10 wherein said melt-processable polymer is selected from the group consisting of olefin homopolymers, olefin copolymers, and poly(vinyl chloride).

12. The composition of claim 1 further comprising a third layer situated between said first layer and said second layer and functioning to enhance the adhesion between said first layer and said second layer.

13. A shaped article comprising the composition of claim 1.

14. The shaped article of claim 13 selected from the group consisting of a wire coating, a tube, a container, a sheet, cable jacketing, and a film.

15. A one-step process for preparing the flexible, multi-layer composition of claim 1 comprising the step of co-processing the layers of said composition.

16. The process of claim 15 wherein said co-processing is co-extrusion.

17. A process for preparing the flexible, multi-layer composition of claim 1 comprising the step of sequentially processing the layers of said composition.

18. A multi-layer composition comprising (a) a first layer comprising semi-crystalline copolymer comprising interpolymerized units derived from tetrafluoroethylene and propylene, wherein less than 10% of the total heat of fusion is attributable to a secondary melt-transition above 300° C. as shown by the heating curve from Differential Scanning Calorimetry; and (b) a second layer comprising melt-processable polymer selected from the group consisting of olefin homopolymers, olefin copolymers, and poly(vinyl chloride).

* * * * *